US011331605B2

(12) United States Patent
Azuma et al.

(10) Patent No.: US 11,331,605 B2
(45) Date of Patent: May 17, 2022

(54) UREA WATER TANK FOR CONSTRUCTION MACHINE

(71) Applicant: Hitachi Construction Machinery Co., Ltd., Tokyo (JP)

(72) Inventors: Hiroyuki Azuma, Ushiku (JP); Nobuei Ariga, Tsuchiura (JP); Tsuyoshi Noi, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 851 days.

(21) Appl. No.: 16/081,613

(22) PCT Filed: Mar. 31, 2017

(86) PCT No.: PCT/JP2017/013615
§ 371 (c)(1),
(2) Date: Aug. 31, 2018

(87) PCT Pub. No.: WO2018/179342
PCT Pub. Date: Oct. 4, 2018

(65) Prior Publication Data
US 2021/0220764 A1 Jul. 22, 2021

(51) Int. Cl.
*B01D 35/027* (2006.01)
*B01D 29/33* (2006.01)
(Continued)

(52) U.S. Cl.
CPC ......... *B01D 35/0276* (2013.01); *B01D 29/33* (2013.01); *B01D 53/9431* (2013.01);
(Continued)

(58) Field of Classification Search
CPC .............. B01D 35/0276; B01D 29/33; B01D 53/9431; E02F 9/0883; E02F 3/32;
(Continued)

(56) References Cited

U.S. PATENT DOCUMENTS

2008/0256937 A1\* 10/2008 Suzuki .................. F01N 13/02
60/300
2011/0147485 A1\* 6/2011 Perruchot ............. F01N 3/2066
239/133
(Continued)

FOREIGN PATENT DOCUMENTS

CN          201714464 U     1/2011
EP          2 573 350 A1    3/2013
(Continued)

OTHER PUBLICATIONS

Extended European Search Report issued in counterpart European Application No. 17897219.6 dated Dec. 16, 2019 (eight (8) pages).
(Continued)

*Primary Examiner* — Devon C Kramer
*Assistant Examiner* — Kelsey L Stanek
(74) *Attorney, Agent, or Firm* — Crowell & Moring LLP

(57) ABSTRACT

A urea water tank (11) is provided with a unit insertion opening (12H) that is disposed on a top surface part (12A) of a tank body (12) and opens more largely than an external dimension (D2) of a sensor unit (20), a sensor mounting member (16) that is disposed on the top surface part (12A) of the tank body (12) and closes the unit insertion opening (12H), and a filter which is formed as a tubular body to surround the sensor unit (20), and inserted in the unit insertion opening (12H) of the tank body (12) from a lower end (24A4)-side, and having an upper end (24A3) mounted on the top surface part (12A) of the tank body (12) by using the sensor mounting member (16).

4 Claims, 14 Drawing Sheets

(51) Int. Cl.
*B01D 53/94* (2006.01)
*E02F 9/08* (2006.01)
*F01N 3/20* (2006.01)
*E02F 3/32* (2006.01)

(52) U.S. Cl.
CPC .......... *E02F 9/0883* (2013.01); *F01N 3/2066* (2013.01); *E02F 3/32* (2013.01); *F01N 2610/02* (2013.01); *F01N 2610/1406* (2013.01); *F01N 2610/148* (2013.01); *F01N 2610/1426* (2013.01)

(58) Field of Classification Search
CPC ............ F01N 3/2066; F01N 2610/02; F01N 2610/1406; F01N 2610/1426; F01N 2610/148
USPC .......................................................... 210/85
See application file for complete search history.

(56) References Cited

U.S. PATENT DOCUMENTS

| | | | | |
|---|---|---|---|---|
| 2015/0196862 A1* | 7/2015 | Cassidy | ............. | B01D 35/0276 55/372 |
| 2015/0198071 A1 | 7/2015 | Hudgens et al. | | |
| 2015/0354425 A1* | 12/2015 | Hudgens | .................. | H05B 3/82 29/611 |
| 2017/0159527 A1* | 6/2017 | Bruck | .................. | F01N 13/1827 |
| 2017/0189837 A1* | 7/2017 | Herold | ............... | B01D 35/0276 |

FOREIGN PATENT DOCUMENTS

| | | | | |
|---|---|---|---|---|
| EP | 2706208 B1 * | 7/2016 | ........... | F01N 3/2066 |
| JP | 8-268303 A | 10/1996 | | |
| JP | 2008-240546 A | 10/2008 | | |
| JP | 2010-275902 A | 12/2010 | | |
| JP | 2012-225304 A | 11/2012 | | |
| JP | 2013-144962 A | 7/2013 | | |
| JP | 2015-121102 A | 7/2015 | | |
| JP | 2015-193992 A | 11/2015 | | |
| JP | 2016-151489 A | 8/2016 | | |

OTHER PUBLICATIONS

Chinese-language Office Action issued in Chinese Application No. 201780013945.9 dated Aug. 4, 2020 with English translation (15 pages).
International Search Report (PCT/ISA/220 & PCT/ISA/210) issued in PCT Application No. PCT/JP2017/013615 dated May 23, 2017 (five pages).
Japanese-language Written Opinion (PCT/ISA/237) issued in PCT Application No. PCT/JP2017/013615 (five pages).
Korean-language Office Action issued in counterpart Korean Application No. 10-2018-7025085 dated Sep. 19, 2019 with English translation (seven (7) pages).

* cited by examiner

UREA WATER TANK FOR CONSTRUCTION MACHINE

TECHNICAL FIELD

The present invention relates to a urea water tank for a construction machine disposed in a hydraulic excavator or the like for reserving urea water that is supplied to an exhaust gas post-treatment device, for example.

BACKGROUND ART

In general, a hydraulic excavator as a representative example of construction machines is configured with an automotive lower traveling structure, an upper revolving structure that is mounted on the lower traveling structure to be capable of revolving thereon and a front device that is mounted on a front side of the upper revolving structure to be capable of tilting and lifting thereto.

The upper revolving structure includes a revolving frame forming a support structure, an engine mounted on the revolving frame, an exhaust gas post-treatment device that is connected to an exhaust side of the engine to purify an exhaust gas discharged from the engine and a urea water tank that reserves urea water to be supplied to the exhaust gas post-treatment device.

The urea water tank includes a tank body that reserves the urea water, and a sensor unit that is disposed to be inserted in the tank body and includes a sensor to detect a state of the urea water. The sensor unit is provided with a heater, a supply line of urea water, a return line and the like. Here, an opening part for insert of the sensor unit is disposed on a top surface part of the tank body. Further, a filter for filtering the urea water is disposed in the periphery of the sensor unit such that impurities that have got through the tank body are not supplied to the exhaust gas post-treatment device side. The filter is formed in such a bag shape as to wrap the sensor unit (Patent Document 1).

PRIOR ART DOCUMENT

Patent Document

Patent Document 1: U.S. Patent Application Publication No. 2015/0196862

SUMMARY OF THE INVENTION

Incidentally, since Patent Document 1 is configured such that the filter is mounted to the sensor unit, a mounting component is necessary between the sensor unit and the filter. As a result, there is posed a problem of inviting degradation of workability and an increase in cost at the time of assembling the urea water tank. In addition, there is a possibility that the bag shaped filter comes into contact with various kinds of sensors during the replacement work of the filter. Therefore, there is a problem that at the replacement working time it is necessary to work in a careful way not to damage the sensors, taking time for the replacement work of the filter.

The present invention is made in view of the aforementioned problems in the conventional art, and an object of the present invention is to provide a urea water tank for a construction machine that can dispose a filter in a simple configuration and further, can easily perform a replacement work of the filter.

The present invention provides a urea water tank for a construction machine comprising a tank body for reserving urea water that is supplied to an exhaust gas post-treatment device for purifying an exhaust gas of an engine mounted on a vehicle body; and a sensor unit that is disposed to be inserted in the tank body and includes a sensor to detect a state of the urea water, wherein the urea water tank for the construction machine including: an opening that is disposed on at least one surface of a top surface part and a bottom surface part of the tank body and opens more largely than an external dimension of the sensor unit; a closing member that is disposed on the one surface of the tank body to close the opening; and a filter which is formed as a tubular body to surround the sensor unit and inserted in the opening of the tank body from a tip end side of the filter having a base end mounted on the one surface of the tank body by using the closing member According to the present invention, the filter can be disposed in a simple configuration and the replacement work of the filter can be easily performed.

MODE FOR CARRYING OUT THE INVENTION

Hereinafter, a urea water tank for a construction machine according to embodiments in the present invention will be in detail explained with reference to the accompanying drawings, by taking a urea water tank disposed in a hydraulic excavator of a crawler type as an example.

FIG. 1 to FIG. 8 show a first embodiment of the present invention. In the first embodiment, an opening disposed on a top surface part of a tank body serve as a unit insertion opening for inserting a sensor unit. The sensor unit is mounted on a closing member. The filter is provided with a flange part extending in a radial outside at the base end, and the filter is inserted in the tank body through the unit insertion opening from the tip end side. A case where the flange part of the filter is mounted between the top surface part of the tank body and a closing member for closing the unit insertion opening to be tightly held therebetween by the closing member is exemplified In FIG. 1, a hydraulic excavator 1 forms a construction machine of a crawler type. The hydraulic excavator 1 is provided with an automotive crawler type lower traveling structure 2, an upper revolving structure 3 that is mounted on the lower traveling structure 2 to be capable of revolving thereon to forma vehicle body together with the lower traveling structure 2 and a front device 4 that is provided on a front side of the upper revolving structure 3 in a front-rear direction to be capable of lifting and tilting thereto to perform an excavating work of earth and sand or the like.

Figure 2:
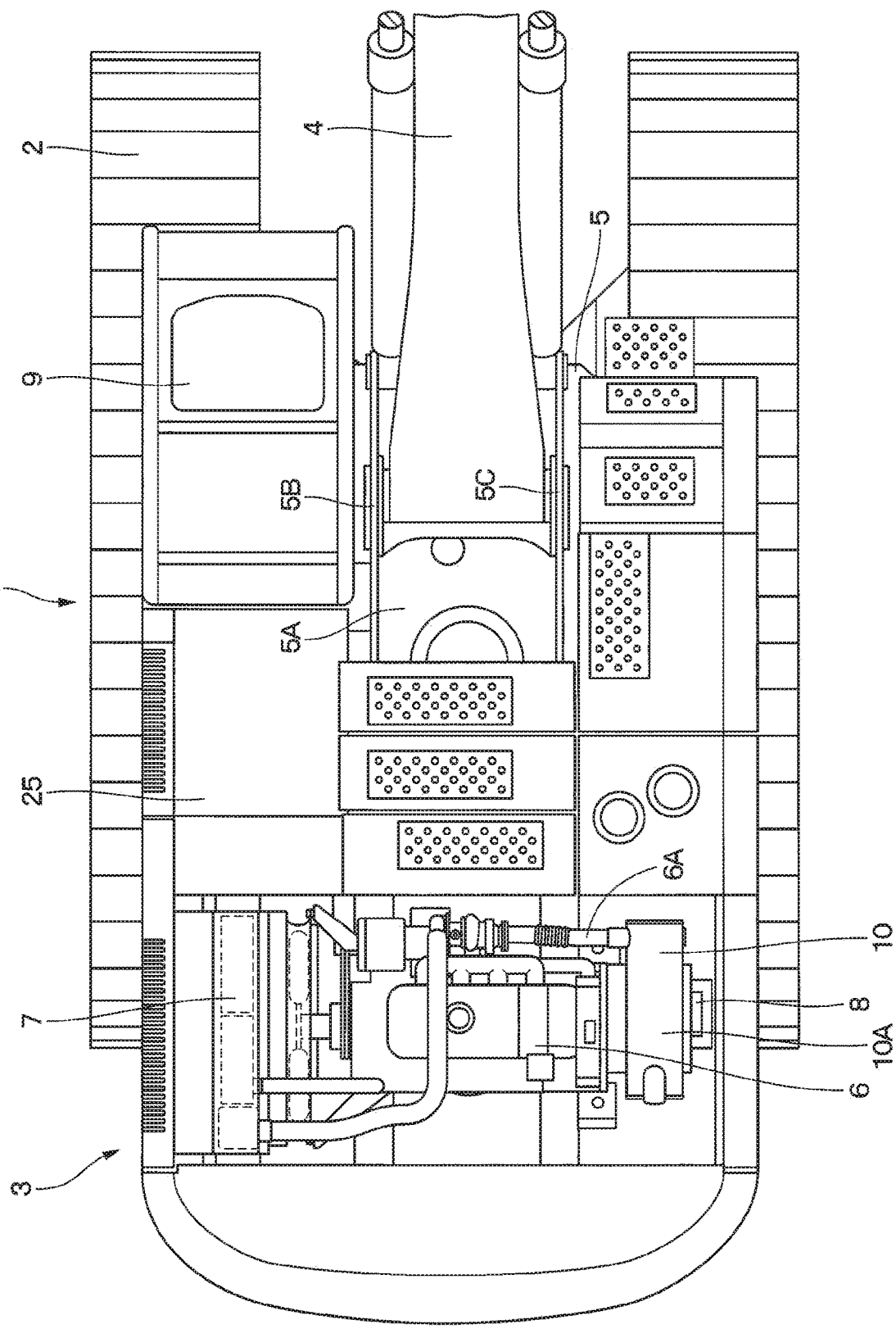
FIG. 2 is a plan view showing the hydraulic excavator with a front device and an exterior cover being partially omitted.
Figure 3:
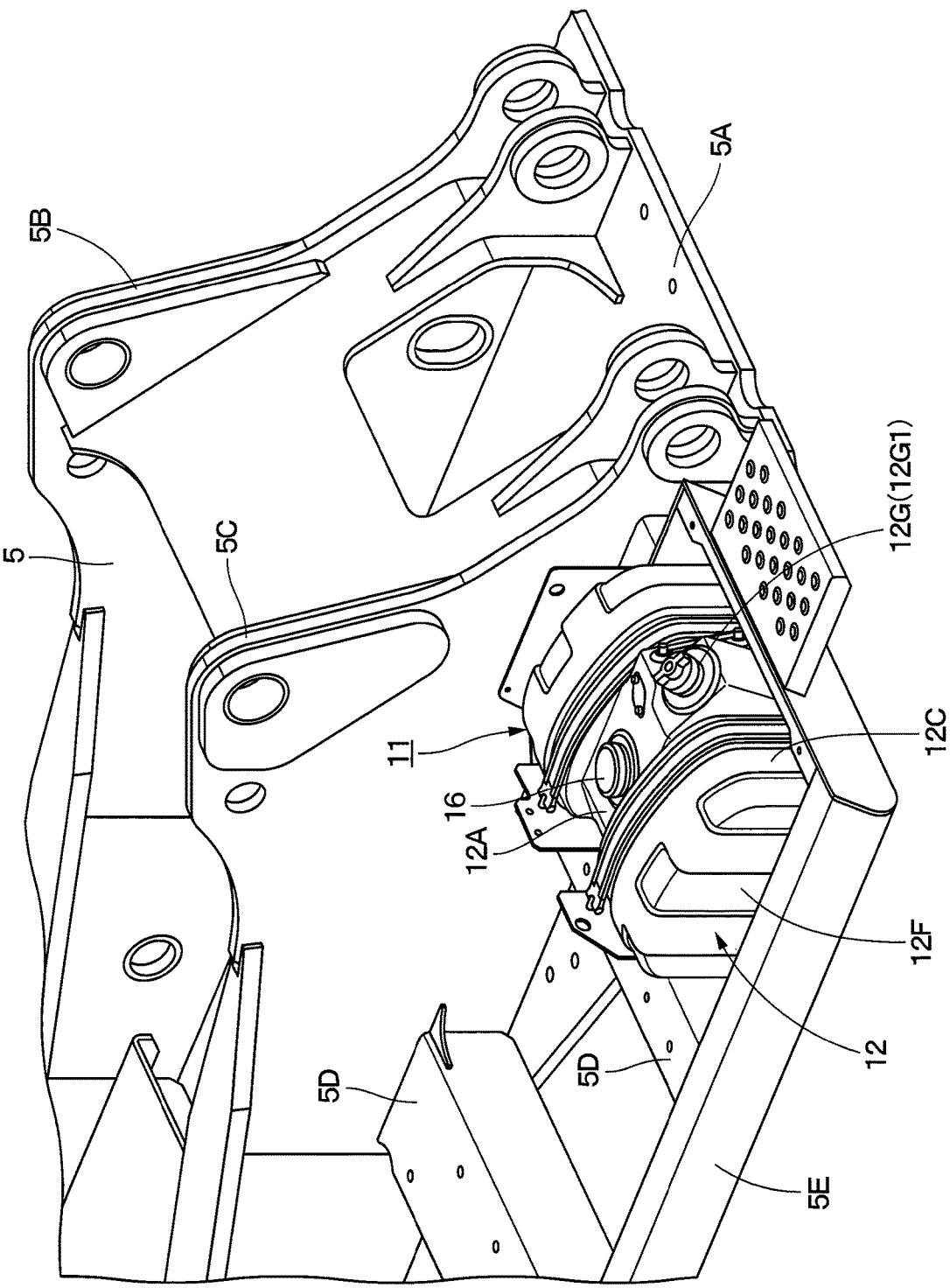
FIG. 3 is an enlarged perspective view of essential part showing a right front part of a revolving frame and a urea water tank.

As shown in FIG. 2 and FIG. 3, the upper revolving structure 3 includes a revolving frame 5, an engine 6, a NOx purifying device 10 and a urea water tank 11, which will be described later.

The revolving frame 5 includes a bottom plate 5A composed of a thick plate body extending in the front-rear direction, a left vertical plate 5B and a right vertical plate 5C that are disposed to rise on the bottom plate 5A and extend in the front-rear direction at a predetermined interval in a left-right direction, a plurality of extension beams 5D (only the left side is shown) that respectively extend outside in the left-right direction from the bottom plate 5A and the respective vertical plates 5B, 5C and are arranged at an interval in the front-rear direction, and a left side frame (not shown) and a right side frame 5E that are positioned outside in the left-right direction to be mounted in tip ends of the respective extension beams 5D and extend in the front-rear direction. The left and right vertical plates 5B, 5C are provided with the front device 4 mounted in the front side position to be capable of lifting and tilting.

The engine 6 is disposed on the rear part of the revolving frame 5. The engine 6 is configured as a diesel engine, and, for example, is mounted in a horizontal state on the revolving frame 5. The engine 6 is provided with an exhaust pipe 6A for discharging an exhaust gas.

The diesel engine 6 is high in efficiency and is excellent in durability, but discharges harmful substances of nitrogen oxides (NOx) and the like together with an exhaust gas. Therefore, the NOx purifying device 10, which will be described later, mounted on the exhaust pipe 6A accommodates a urea selective reduction catalyst that removes nitrogen oxides (NOx) and an oxidation catalyst (none of them is shown) within an accommodating tubular body 10A.

A heat exchanger 7 is disposed on a left side of the engine 6. The heat exchanger 7 includes a radiator for cooling engine cooling water, an oil cooler for cooling hydraulic oil, an intercooler for cooling air to be suctioned by the engine 6, and the like. On the other hand, a hydraulic pump 8 is mounted on a right side of the engine 6. The hydraulic pump 8 is driven by the engine 6 to deliver hydraulic oil from a hydraulic oil tank as pressurized oil.

A cab 9 is disposed on a left front side of the revolving frame 5. The cab 9 is for an operator to get in to drive the hydraulic excavator 1, and accommodates therein an operator's seat on which the operator sits, and levers, pedals and the like (none of them is shown) that are designed to perform various controls.

The NOx purifying device 10 forms an exhaust gas post-treatment device that purifies an exhaust gas discharged from the engine 6 through the exhaust pipe 6A. The NOx purifying device 10 purifies nitrogen oxides (NOx) in the exhaust gas using urea water (urea solution) as a reducing agent. The NOx purifying device 10 includes the accommodating tubular body 10A connected to the exhaust pipe 6A, and a urea selective reduction catalyst, an oxidation catalyst and urea water injection valve (none of them is shown) that are accommodated in the accommodating tubular body 10A. The urea water injection valve is connected to the urea water tank 11 to be described later through a hose, a urea water pump and the like (none of them is shown).

Here, the NOx purifying device 10 causes the urea water injection valve to inject urea water into the exhaust gas and causes the urea selective reduction catalyst to make reduction reaction of NOx in the exhaust gas using ammonia generated from the urea water, thus dissolving the NOx into water and nitrogen. In addition, the ammonia in the exhaust gas is reduced by the oxidation catalyst to purify the NOx in the exhaust gas.

Next, an explanation will be made of the configuration of the urea water tank 11 that is the featuring section of the present invention with reference to FIG. 3 to FIG. 8.

The present embodiment exemplifies a case where the urea water tank 11 is fixed in such a direction that a longitudinal direction of the box shaped urea water tank 11 is a left-right direction and a water supply port 12G of the urea water is disposed in a front side. Following this fixation direction, names along the orientation in the fixed state of the urea water tank 11, that is, along the front-rear direction and the left-right direction of the upper revolving structure 3 are applied to names of the respective components in the urea water tank 11. It should be noted that the urea water tank 11, other than the fixation direction where the longitudinal direction is defined as the left-right direction, may have a fixation direction defining the longitudinal direction as the front-rear direction such that the water supply port 12G is directed to the right or the left.

As shown in FIG. 3, for example, the urea water tank 11 is disposed on a right front side of the revolving frame 5. The urea water tank 11 includes a tank body 12, a sensor mounting member 16, a sensor unit 20 and a filter 24. It should be noted that the urea water tank 11 may be, other than the right front side of the revolving frame 5, arranged in other places such as in the cab 9 or on the revolving frame 5 (in a utility box) in back of the cab 9.

Figure 4:
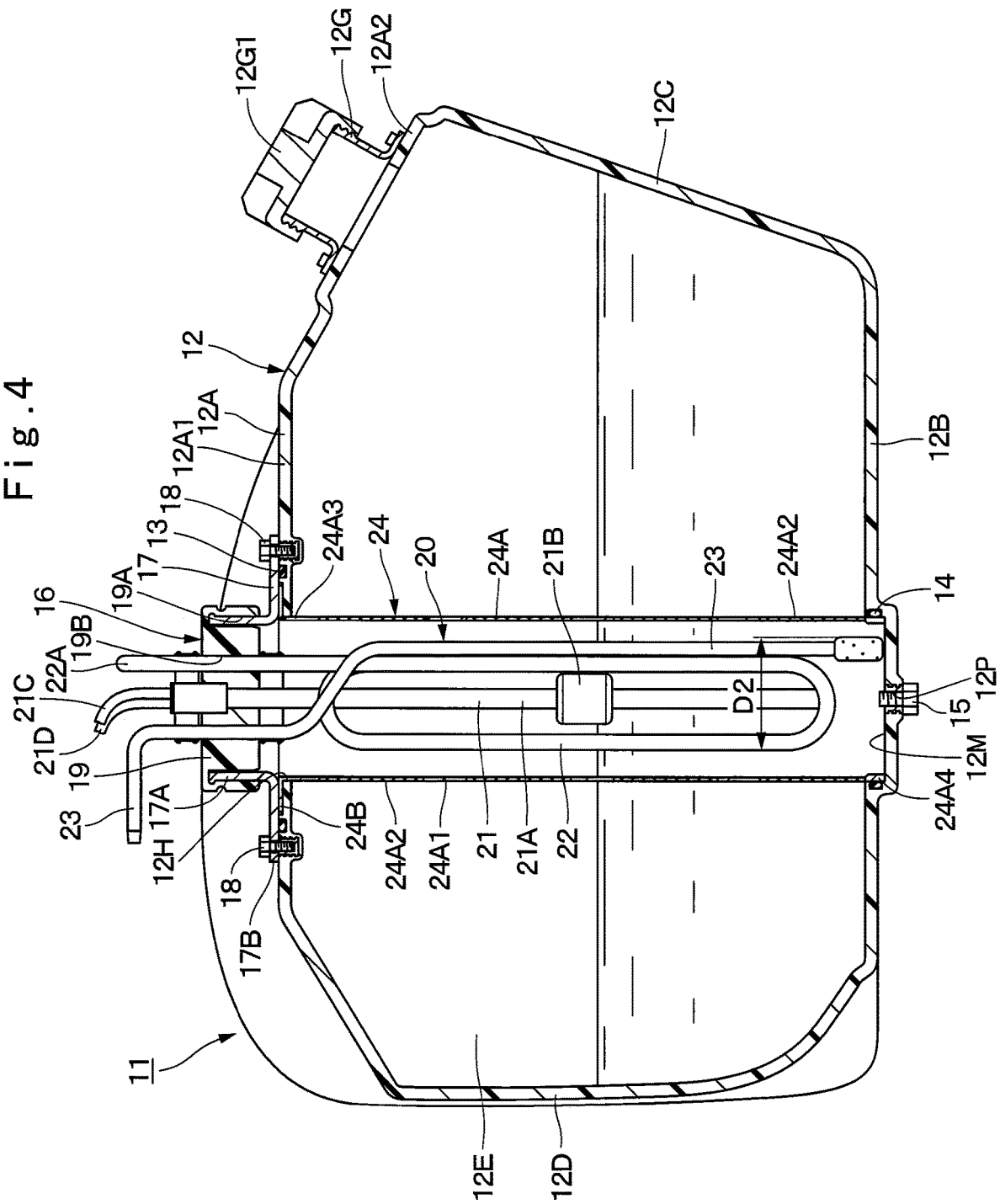
FIG. 4 is a cross section showing the urea water tank in an enlarging manner.

As shown in FIG. 4, the tank body 12 of the urea water tank 11 reserves urea water as a reducing agent to be supplied to the NOx purifying device 10. The tank body 12 is formed as an approximately cuboidal vessel an inside of which is formed as a closed space and is arranged in such a manner that the left-right direction of the revolving frame 5 corresponds to a longer direction. For example, the tank body 12 is formed by molding work using a resin material. The tank body 12 includes a rectangular top surface part 12A longer in the left-right direction, a rectangular bottom surface part 12B facing the top surface part 12A at a distance in the upper-lower direction, a front surface part 12C that is positioned in a front side in a shorter direction of the top surface part 12A and the bottom surface part 12B to connect the top surface part 12A and the bottom surface part 12B, a rear surface part 12D that is positioned in a rear side facing the front surface part 12C to connect the top surface part 12A and the bottom surface part 12B, a left surface part 12E covering a left side of the top surface part 12A, the bottom surface part 12B, the front surface part 12C and the rear surface part 12D, and a right surface part 12F covering a right side of the top surface part 12A, the bottom surface part 12B, the front surface part 12C and the rear surface part 12D.

The top surface part 12A has a flat surface 12A1 formed by recessing and flattening an intermediate part in the left-right direction. A front side of the top surface part 12A ahead of the flat surface 12A1 is formed as an inclined surface 12A2 inclined obliquely downward toward the forward side. The inclined surface 12A2 is provided with the water supply port 12G with a cap 12G1 for supplying urea water.

Figure 5:
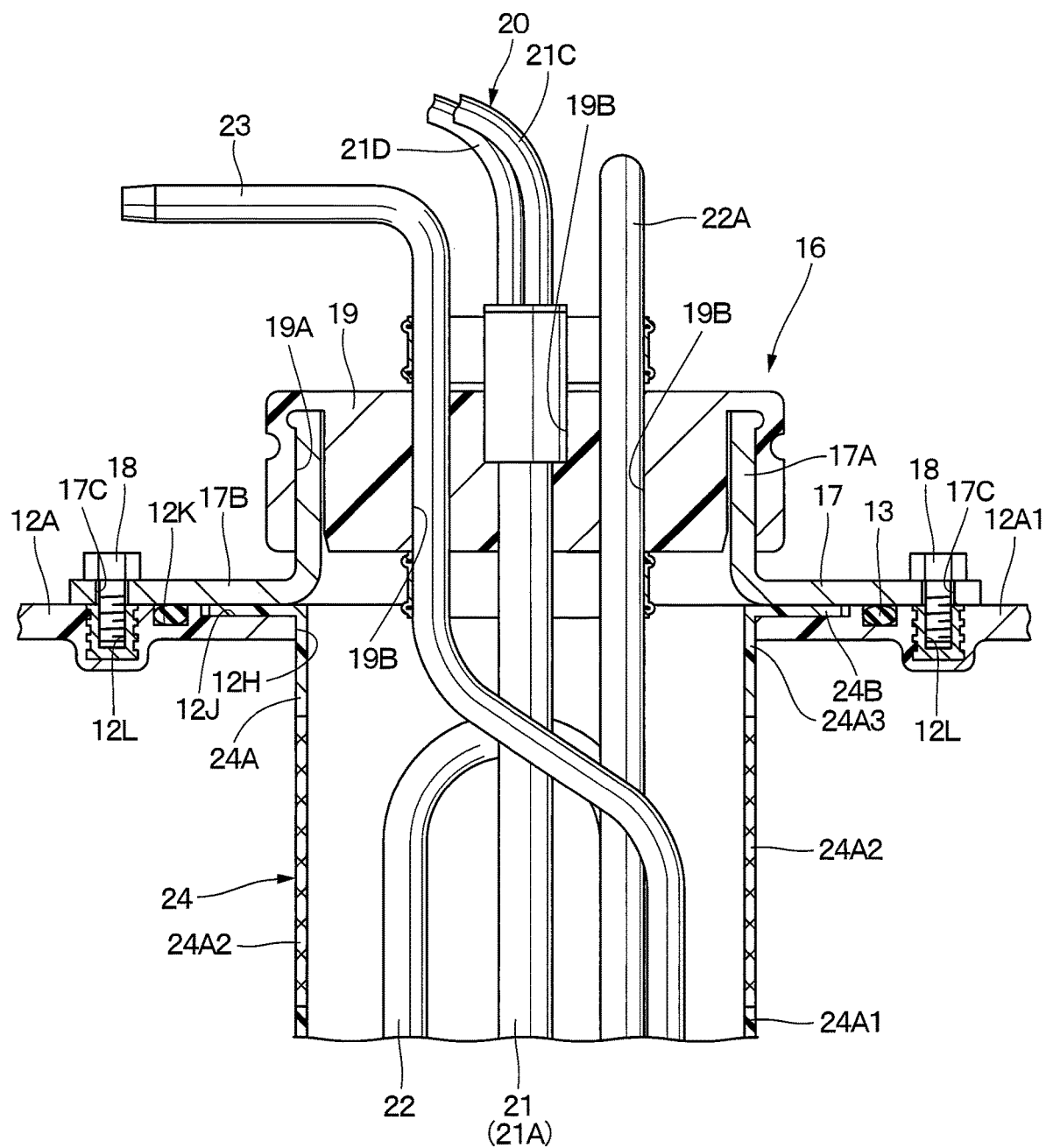
FIG. 5 is a cross section of essential part enlargement showing an upper part side (insertion side) of a filter in FIG. 4 in an enlarging manner.

As shown in FIG. 5, the flat surface 12A1 of the top surface part 12A is provided with a circular unit insertion opening 12H as an opening to be positioned substantially in the center and penetrate in the upper-lower direction. The unit insertion opening 12H is an opening for insertion of the sensor unit 20 to be described later, and opens with a diameter dimension D1 larger than an external diameter D2 of the sensor unit 20. A filter 24 to be described later is inserted in the unit insertion opening 12H from upward to downward. In this case, the unit insertion opening 12H surrounds a filter tubular part 24A of the filter 24 closely, thus making it possible to radially position an upper side section of the filter 24.

An annular recessed part 12J extending in a radial outside from the unit insertion opening 12H is formed on a top surface side of the flat surface 12A1 of the top surface part 12A. A flange part 24B of the filter 24 is arranged in the recessed part 12J, which is set to a depth dimension equivalent to a plate thickness dimension of the flange part 24B and to a diameter dimension slightly larger than a diameter dimension of the flange part 24B.

In addition, an annular groove 12K is positioned in the vicinity of an outer peripheral side of the recessed part 12J and is disposed to open upward on the top surface side of the flat surface 12A1. An O-ring 13 is attached to the annular groove 12K. When the sensor mounting member 16 to be described later is mounted on the tank body 12, the O-ring 13 is to seal between the tank body 12 and a mounting tubular body 17 liquid-tightly.

Further, the flat surface 12A1 of the top surface part 12A is provided with a plurality of screw holes 12L (only two holes are shown) positioned in the vicinity of an outer peripheral side of the annular groove 12K. Bolts 18 for fixing the mounting tubular body 17 are screwed in the screw holes 12L each, which, for example, are formed by embedment of insertion nuts at resin molding.

On the other hand, as shown in FIG. 4, the bottom surface part 12B of the tank body 12 is provided with a fitting part 12M composed of a bottomed recessed hole to be positioned right under the unit insertion opening 12H. A lower end (tip end) 24A4 of the filter tubular part 24A in the filter 24 is fitted in the fitting part 12M. Thereby, the fitting part 12M holds the lower end 24A4 of the filter tubular part 24A in a radially positioning state. Therefore, the fitting part 12M is formed with substantially the same diameter dimension (inner diameter dimension) as a diameter dimension D1 of the unit insertion opening 12H. An inner peripheral surface 12M1 of the fitting part 12M is provided with an annular groove 12N to open to an inner diameter side. An O-ring 14 as a resilient member is inserted in the annular groove 12N. Here, the O-ring 14 resiliently abuts on the lower end 24A4 of the filter tubular part 24A forming the filter 24 from a radial outside. Thereby, the O-ring 14 protects the filter 24 from vibrations or impacts while holding the tip end side of the filter 24.

Further, a screw hole 12P (insertion nut) is positioned inside of the filter 24, that is, in a substantially center part of the fitting part 12M to be formed to penetrate in the upper-lower direction. The screw hole 12P discharges the urea water in the inside of the tank body 12 at the maintenance work of the tank body 12. A drain plug 15 is regularly screwed in the screw hole 12P. The drain plug 15 is formed as a hexagon bolt, for example.

The screw hole 12P and the drain plug 15 are disposed to be positioned inside of the filter 24. Therefore, when the drain plug 15 is removed, it is possible to discharge all the urea water within the filter 24.

Next, descriptions will be made of the configuration of the sensor mounting member 16 as a closing member that is part of the characterized portion of the present invention.

The sensor mounting member 16 forms the closing member and is disposed on the flat surface 12A1 of the top surface part 12A forming the tank body 12 to close the unit insertion opening 12H. The sensor mounting member 16 is configured of the mounting tubular body 17 to be mounted on the flat surface 12A1 and a cap body 19 to be fitted in the mounting tubular body 17.

The mounting tubular body 17 is made of a metallic material, for example, and is formed of a tubular part 17A with a diameter dimension equivalent to the unit insertion opening 12H and a diameter expanded part 17B in a disc shape extending in a radial outside from a lower end of the tubular part 17A. A plurality of bolt through holes 17C are disposed on an outer peripheral side of the diameter expanded part 17B to correspond to the respective screw holes 12L of the top surface part 12A.

Here, the mounting tubular body 17 has the tubular part 17A that is arranged substantially coaxially with the unit insertion opening 12H and the diameter expanded part 17B that abuts on the flat surface 12A1 of the top surface part 12A. In this state, the bolts 18 inserted in the respective bolt through holes 17C are screwed in the respective screw holes 12L of the top surface part 12A. Thereby, the mounting tubular body 17 can mount the diameter expanded part 17B on the top surface part 12A. At this time, the diameter expanded part 17B tightly holds the flange part 24B of the filter 24 between the top surface part 12A (recessed part 12J) and the diameter expanded part 17B.

The cap body 19 is formed in a thick disc shape of a resin material having resiliency. An annular groove 19A composed of a tubular deep groove is formed on an outer peripheral side of the cap body 19, and the tubular part 17A of the mounting tubular body 17 is liquid-tightly fitted in the annular groove 19A. A plurality of insertion holes 19B is disposed in a center side of the cap body 19 to penetrate in the upper-lower direction. Upper parts of a rod part 21A of a level sensor 21, a connecting pipe part 22A of a heater 22, a supply line 23, a return line (not shown) and the like are inserted in the respective insertion holes 19B in a press-fitting state using resiliency. Thereby, the cap body 19 can fixedly support the upper parts of the rod part 21A of the level sensor 21, the heater 22, the supply line 23 and the return line by fastening amounts (resilient forces) of the respective insertion holes 19B.

Next, descriptions will be made of the sensor unit 20 disposed to be inserted in the tank body 12 and having various sensors that detect a state of the urea water. The sensor unit 20 detects mainly a state of the urea water in the tank body 12, for example, information of a temperature, quality, a remaining amount and the like of the urea water. The sensor unit 20 is provided with a function of warming the urea water and paths of supply and return of the urea water in addition to detection of the information of the urea water. That is, the sensor unit 20 includes the level sensor 21, the heater 22 and the supply line 23, which will be described later. The level sensor 21, the heater 22, the supply line 23 and the like are arranged in a predetermined position within the tank body 12 by holding the upper part sides by the cap body 19 of the sensor mounting member 16.

The level sensor 21 measures a remaining amount of urea water in the tank body 12. The level sensor 21 is formed of the linear rod part 21A extending downward from the cap body 19 and a float 21B mounted on the rod part 21A to be movable in the upper-lower direction. A lead wire 21C for outputting a positional signal of the float 21B, a lead wire 21D for outputting detection signals of density and a temperature of urea water and the like are disposed to extend in the rod part 21A of the level sensor 21.

The heater 22 heats urea water by circulating the heated engine cooling water. The heater 22 is formed of a long pipe material and is formed to roll around in such a manner as to draw a circle in the upper-lower direction. The heater 22 has connecting pipe parts 22A (only one is shown) in an inlet side and in an outlet side extending upward. The connecting pipe part 22A of the heater 22 extends through the insertion hole 19B of the cap body 19 to the exterior and is connected to the engine 6 or the heat exchanger 7.

The supply line 23 of urea water supplies the urea water in the tank body 12 toward the NOx purifying device 10. The return line (not shown) of the urea water is disposed in parallel with the supply line 23 of the urea water. The supply line 23 has a lower end part as a suction side that is positioned in the vicinity of the bottom surface part 12B (fitting part 12M) of the tank body 12 and an upper end side that extends through the insertion hole 19B of the cap body 19 to the exterior.

Figure 6:
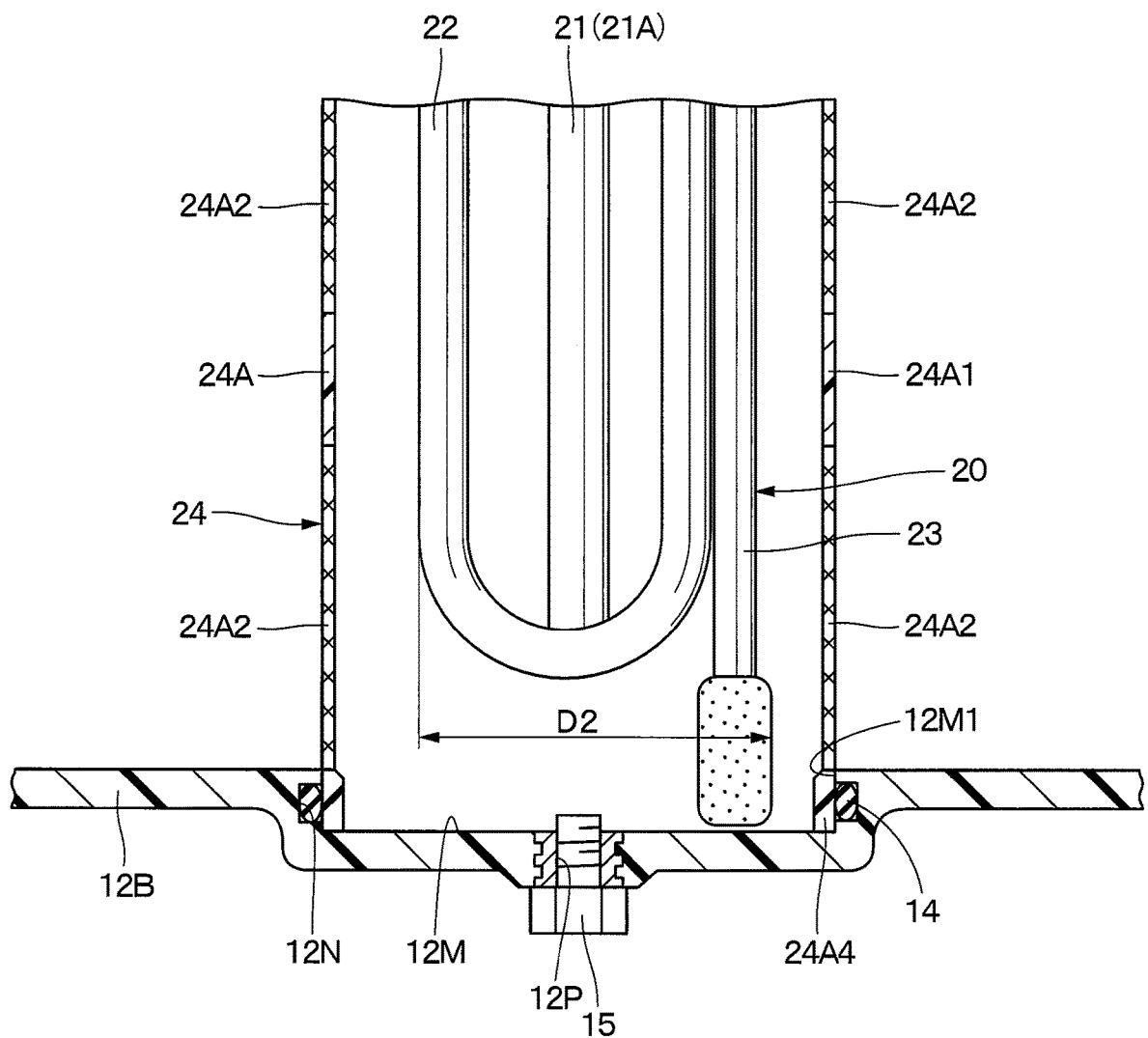
FIG. 6 is a cross section of essential part enlargement showing a lower part side (fitting side) of the filter in FIG. 4 in an enlarging manner.
Figure 7:
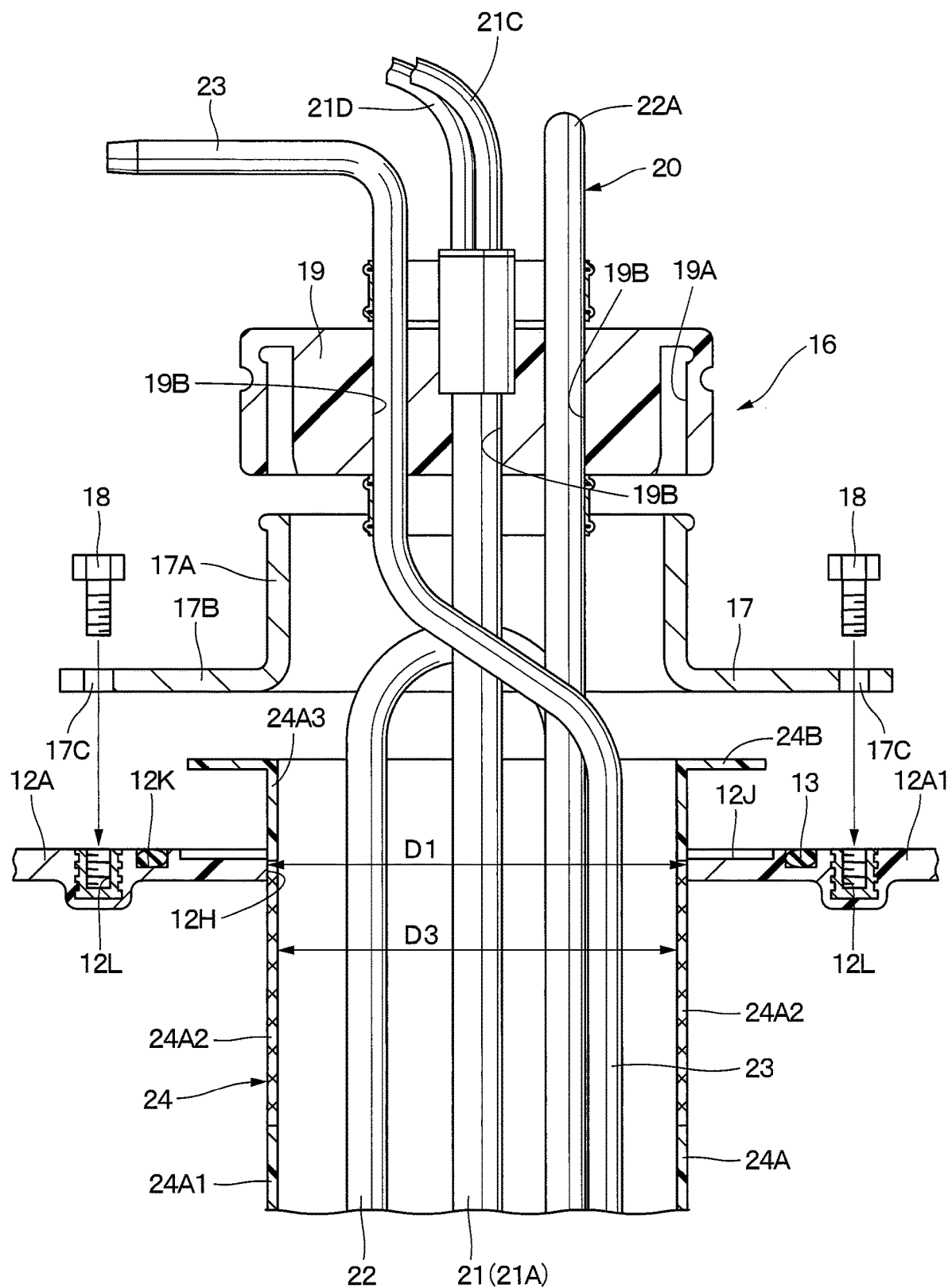
FIG. 7 is an exploded cross section showing a top surface part of a tank body, a sensor mounting member, a sensor unit and the filter as shown in FIG. 5 in an exploding manner.

Here, an external dimension of the sensor unit 20 will be described. In the sensor unit 20, the level sensor 21, the heater 22, the supply line 23 and the return line are inserted in the tank body 12. In this state, the level sensor 21, the heater 22, the supply line 23 and the return line are arranged to bundle in the tank body 12. The smallest virtual circle that can surround the level sensor 21, the heater 22, the supply line 23 and the return line bundled is drawn. A diameter dimension of the smallest virtual circle, that is, a dimension D2 shown in FIG. 4 and FIG. 6 is an external dimension of the sensor unit 20 in the tank body 12. The external dimension D2 of the sensor unit 20 is a value smaller than a diameter dimension D1 of the unit insertion opening 12H of the tank body 12.

Next, descriptions will be made of the configuration of the filter 24 and the mounting procedure of the filter 24 to the tank body 12 that are part of the characterized portion of the present invention. Here, in the first embodiment, the filter 24 is configured to be inserted in the tank body 12 from above. Therefore, in the first embodiment an upper end of the filter 24 becomes a base end and a lower end thereof becomes a tip end.

Figure 8:
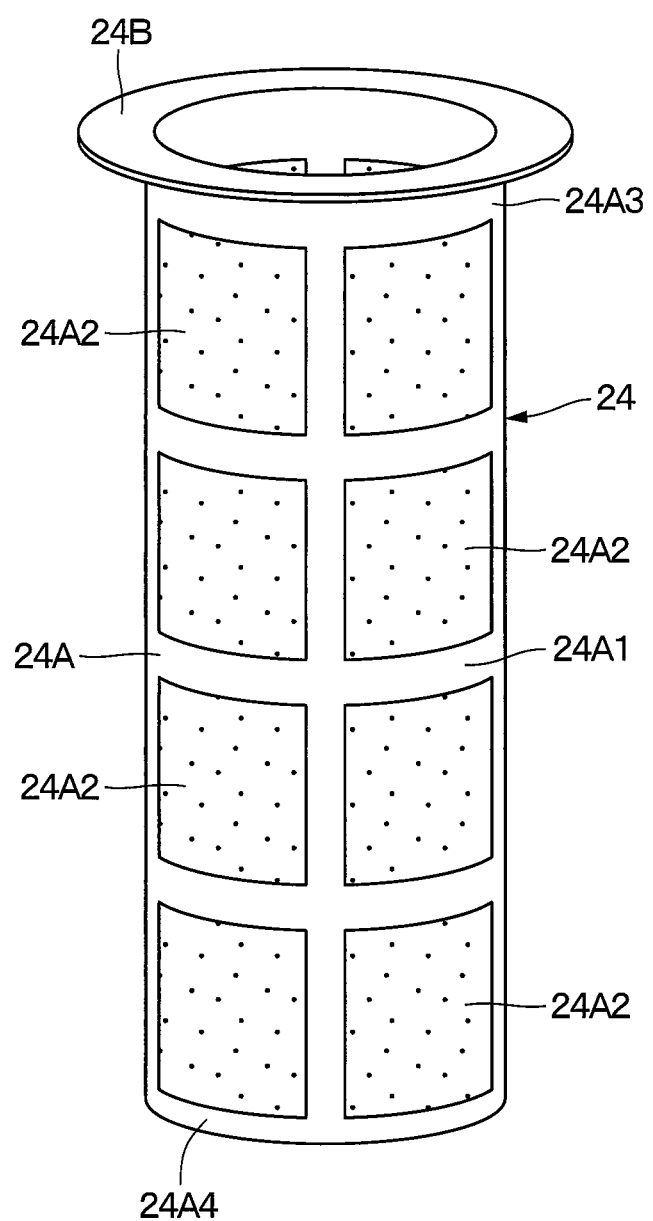
FIG. 8 is a perspective view showing the filter in a single unit.

The filter 24 is disposed in the tank body 12 to surround the level sensor 21, the heater 22, the supply line 23 and the return line. The filter 24 is formed in a tubular shape using a resin material, for example. The filter 24 is configured to be inserted in the unit insertion opening 12H of the tank body 12 from the tip end side. As shown in FIG. 8, the filter 24 is formed of a filter tubular part 24A in a tubular shape longer in the upper-lower direction and a flange part 24B extending in a radical outside from an upper end (base end) of the filter tubular part 24A.

The filter tubular part 24A is formed of a framing tube 24A1 formed by rolling around a lattice body in a tubular shape and a plurality of filter sheets 24A2 composed of a mesh, felt or the like closing each opening in the lattice of the framing tube 24A1. As shown in FIG. 5, an upper end 24A3 that is a base end of the filter tubular part 24A is inserted in the unit insertion opening 12H of the top surface part 12A forming the tank body 12 in a fitting state. On the other hand, as shown in FIG. 6, a lower end 24A4 that is a tip end of the filter tubular part 24A is fitted in the fitting part 12M of the bottom surface part 12B forming the tank body 12.

Accordingly, the filter tubular part 24A is formed as a tubular body slightly smaller than the unit insertion opening 12H, and an inner diameter dimension D3 thereof (refer to FIG. 7) is formed in a dimension larger than the external dimension D2 (refer to FIG. 4 and FIG. 6) of the aforementioned sensor unit 20. That is, a relation of the diameter dimension D1 of the unit insertion opening 12H, the external dimension D2 of the sensor unit 20 and the inner diameter dimension D3 of the filter tubular part 24A is set as indicated at the following Formula 1.

$$D2 < D3 < D1 \qquad \text{[Formula 1]}$$

Thereby, at the removal work of the sensor unit 20, the level sensor 21, the heater 22, the supply line 23, the return line and the like can be pulled out of or inserted in the filter tubular part 24A not to come in contact with the filter tubular part 24A.

The flange part 24B is set to have an outer diameter dimension smaller than the inner diameter dimension of the recessed part 12J of the top surface part 12A forming the tank body 12. The flange part 24B is set to have a plate thickness dimension equivalent to a depth dimension of the recessed part 12J in the upper-lower direction. Thereby, the flange part 24B can be accommodated in the recessed part 12J.

An explanation will be made of an example of the procedure in a case of mounting the filter 24 on the tank body 12. The filter tubular part 24A in the filter 24 is inserted downward in the unit insertion opening 12H of the tank body 12 from the lower end 24A4. In this insertion state, since the upper end 24A3 of the filter tubular part 24A is supported by the unit insertion opening 12H, the upper side of the filter tubular part 24A can be radially positioned by the unit insertion opening 12H. On the other hand, since the lower end 24A4 of the filter tubular part 24A is fitted in the fitting part 12M, the lower side of the filter tubular part 24A can be radially positioned by the fitting part 12M. In addition, in a state where the lower end 24A4 of the filter tubular part 24A is fitted in the fitting part 12M, since the filter tubular part 24A can be held at the lower end 24A4-side by the O-ring 14 having resiliency, the lower end 24A4-side of the filter tubular part 24A can be protected from vibrations or impacts.

The urea water tank 11 according to the first embodiment has the configuration as described above, and next, an explanation will be made of an example of the working procedure in a case of assembling the urea water tank 11.

First, descriptions will be made of a case of mounting the sensor unit 20 on the sensor mounting member 16. The upper end sides of the level sensor 21, the heater 22, the supply line 23, the return line and the like are inserted in the respective insertion holes 19B of the cap body 19, which is made to be in a state of being held by a resilient force. In this state, the tubular part 17A of the mounting tubular body 17 is fitted in the annular groove 19A of the cap body 19. Thereby, the sensor mounting member 16 and the sensor unit 20 can be formed as one subassembly.

On the other hand, at the tank body 12-side the filter tubular part 24A of the filter 24 is inserted in the unit insertion opening 12H of the tank body 12 from the lower end 24A4-side. Thereby, the lower end 24A4 of the filter tubular part 24A is fitted in the fitting part 12M through the O-ring 14. In addition, the flange part 24B is arranged in the recessed part 12J of the tank body 12. Thereby, the filter 24 can be inserted in the tank body 12 in a positioning state.

When the filter 24 is inserted in the tank body 12, the subassembly composed of the sensor mounting member 16 and the sensor unit 20 is assembled in the tank body 12. In this case, the level sensor 21, the heater 22, the supply line 23, the return line and the like of the sensor unit 20 mounted on the sensor mounting member 16 are inserted in the unit insertion opening 12H of the tank body 12, that is, in the filter 24 from the lower end side. At this time, the inner diameter dimension D3 of the filter tubular part 24A in the filter 24 is formed in a dimension larger than the external dimension D2 of the sensor unit 20. Thereby, the level sensor 21, the heater 22, the supply line 23, the return line and the like can be smoothly inserted in the filter tubular part 24A without being in contact with the filter tubular part 24A.

Next, when the sensor unit 20 is inserted in the filter 24, the diameter expanded part 17B of the mounting tubular body 17 forming the sensor mounting member 16 is caused to abut on the flat surface 12A1 of the top surface part 12A of the tank body 12. In this state, the bolt 18 is inserted in each of the bolt through holes 17C disposed in the diameter expanded part 17B and the bolt 18 is screwed in each of the screw holes 12L of the top surface part 12A.

Thereby, the sensor mounting member 16 can be mounted to the tank body 12 using each of the bolts 18. Using the mounting structure of the sensor mounting member 16, the filter 24 can be mounted by holding the flange part 24B tightly between the top surface part 12A of the tank body 12 and the diameter expanded part 17B of the mounting tubular body 17. The sensor unit 20 mounted to the sensor mounting member 16 can be arranged in the inside of the filter 24.

On the other hand, in a case where the set working time of the hydraulic excavator 1 elapses and the filter 24 is replaced, each of the bolts 18 is removed, and the sensor mounting member 16 is pulled up to the upper side and the sensor unit 20 is removed from the tank body 12. Thereby, the filter 24 can be easily removed from the unit insertion opening 12H. By the procedure in reverse to this, a new filter 24 can be easily mounted to the tank body 12.

Figure 1:
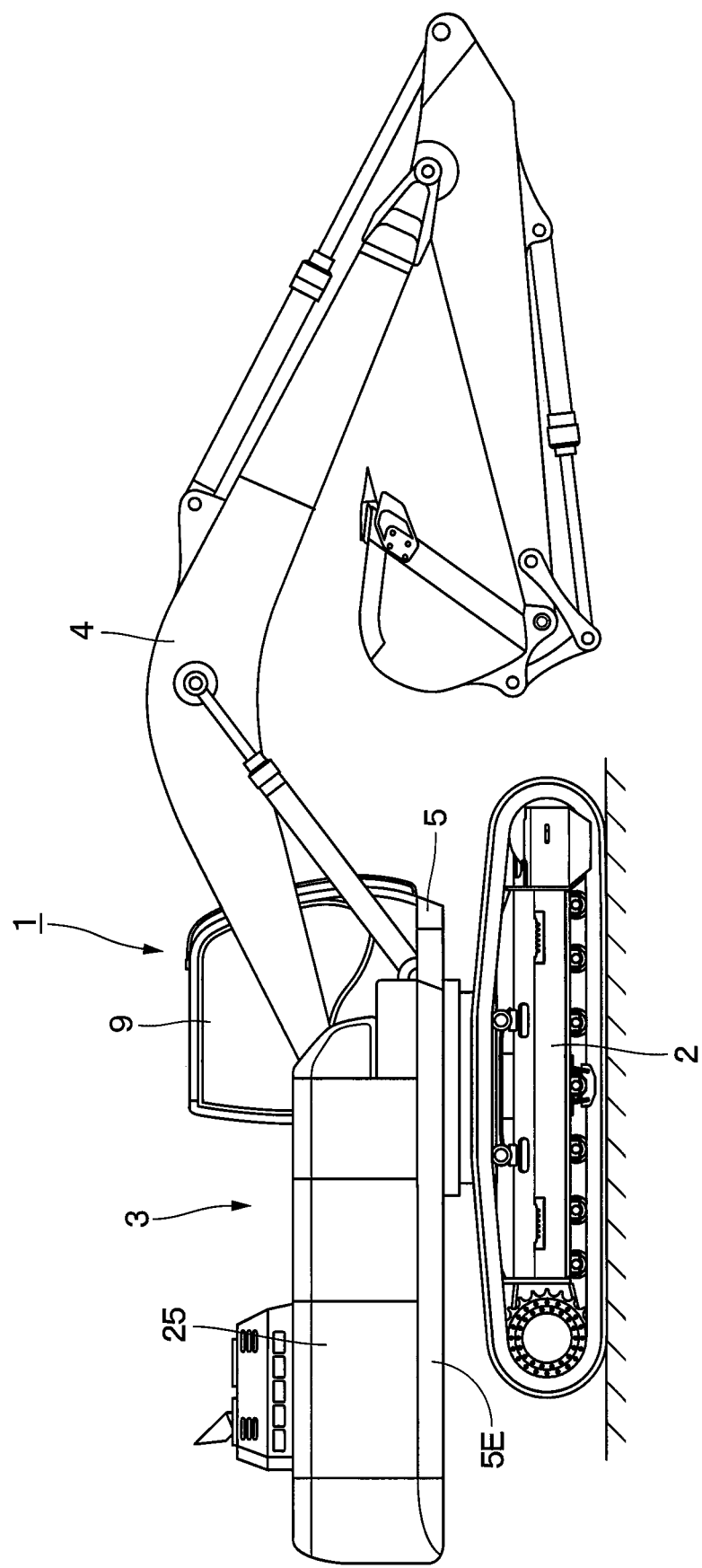
FIG. 1 is a front view showing a hydraulic excavator that will be applied to a first embodiment in the present invention.

It should be noted that as shown in FIG. 1 and FIG. 2, the exterior cover 25 covers equipment devices including the engine 6, the heat exchanger 7, the hydraulic pump 8 and the NOx purifying device 10 from laterally and above.

In this way, according to the first embodiment, the urea water tank 11 is provided with the unit insertion opening 12H that is disposed on the top surface part 12A of the tank body 12 and opens more largely than the external dimension D2 of the sensor unit 20 (with a larger diameter dimension D1), the sensor mounting member 16 that is disposed on the top surface part 12A of the tank body 12 and closes the unit insertion opening 12H, and a tubular body that is inserted in the unit insertion opening 12H of the tank body 12 from the lower end 24A4-side and surrounds the sensor unit 20, the filter 24 having the upper end 24A3 that is mounted on the top surface part 12A of the tank body 12 using the sensor mounting member 16.

Accordingly, exclusive mounting components such as bolts or brackets are not required for mounting the filter 24 to the tank body 12. As a result, it is possible to improve workability at the time of assembling the urea water tank 11. In addition, the replacement work of the filter 24 can be easily performed. Further, the filter 24 is formed such that the inner diameter dimension D3 of the filter tubular part 24A is larger than the external dimension D2 of the sensor unit 20. Thereby, the sensor unit 20 can be safely and easily pulled out of or inserted in the filter 24 without coming in contact with the filter 24.

The filter 24 has the flange part 24B extending in a radial outside in the upper end 24A3 that is a base end of the filter tubular part 24A. Further, the filter 24 is inserted in the tank body 12 through the unit insertion opening 12H from the lower end 24A4-side. Thereby, the sensor mounting member 16 enables the flange part 24B to be mounted to be tightly held between the sensor mounting member 16 and the top surface part 12A of the tank body 12. As a result, the filter 24 can be mounted within the tank body 12 in a simple configuration of tightly holding the flange part 24B between the sensor mounting member 16 and the top surface part 12A of the tank body 12.

The bottom surface part 12B of the tank body 12 is provided with the screw hole 12P and the drain plug 15 that are positioned inside of the filter 24 to discharge the urea water. Thereby, when the drain plug 15 is removed, all the urea water in the filter 24 can be discharged.

The bottom surface part 12B of the tank body 12 is provided with the fitting part 12M in which the lower end 24A4 of the filter tubular part 24A in the filter 24 is fitted. This structure can position the lower end 24A4-side of the filter tubular part 24A radially.

In addition, the inner peripheral surface 12M1 of the fitting part 12M is provided with the O-ring 14 having resiliency. This structure can protect the lower end 24A4-side of the filter tubular part 24A from vibrations or impacts at traveling or working.

Next, FIG. 9 to FIG. 12 show a second embodiment in the present invention. The present embodiment is characterized in that an opening disposed on a bottom surface part of a tank body serve as a filter insertion opening for insertion of a filter in a position facing a sensor unit in an upper-lower direction. The filter has a flange part extending in a radial outside at the base end, and the filter is inserted in the tank body through the filter insertion opening from the tip end side. A closing member for closing the filter insertion opening enables the flange part of the filter to be mounted to be tightly held between the closing member and the bottom surface part of the tank body. It should be noted that in the second embodiment, components identical to those in the aforementioned first embodiment are referred to as identical reference numerals to omit an explanation thereof.

Figure 9:
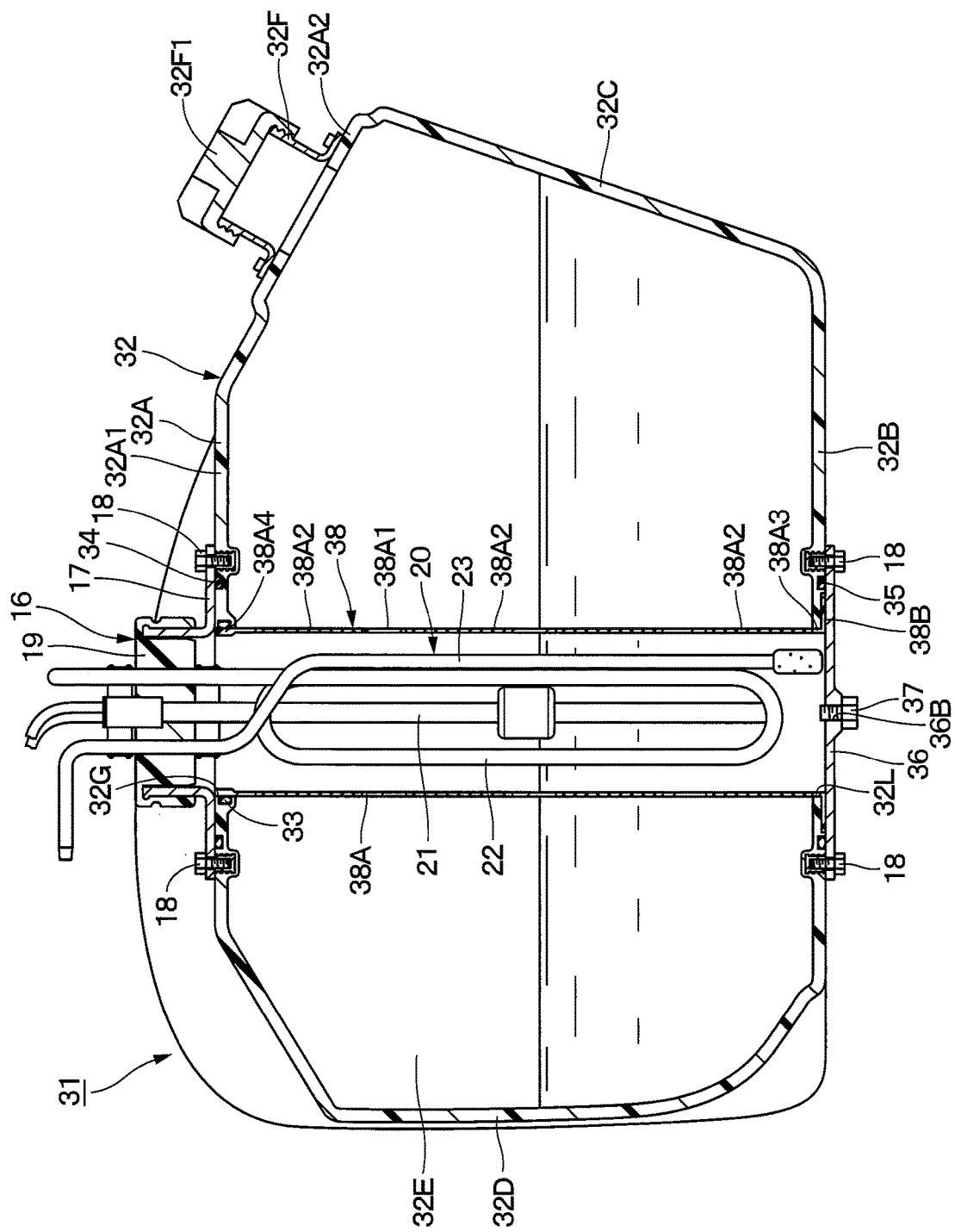
FIG. 9 is a cross section shown a urea water tank according to a second embodiment in the present invention.

In FIG. 9, a urea water tank 31 according to the second embodiment includes the sensor mounting member 16 and the sensor unit 20 that are described above, and a tank body 32, a closing bottom plate 36 and a filter 38 that will be described later.

The tank body 32 according to the second embodiment is, as substantially similar to the tank body 12 according to the first embodiment, formed of a top surface part 32A having a flat surface 32A1 and an inclined surface 32A2, a bottom surface part 32B, a front surface part 32C, a rear surface part 32D, a left surface part 32E and a right surface part (not shown). The inclined surface 32A2 of the top surface part 32A is provided with a water supply port 32F with a cap 32F1.

Figure 10:
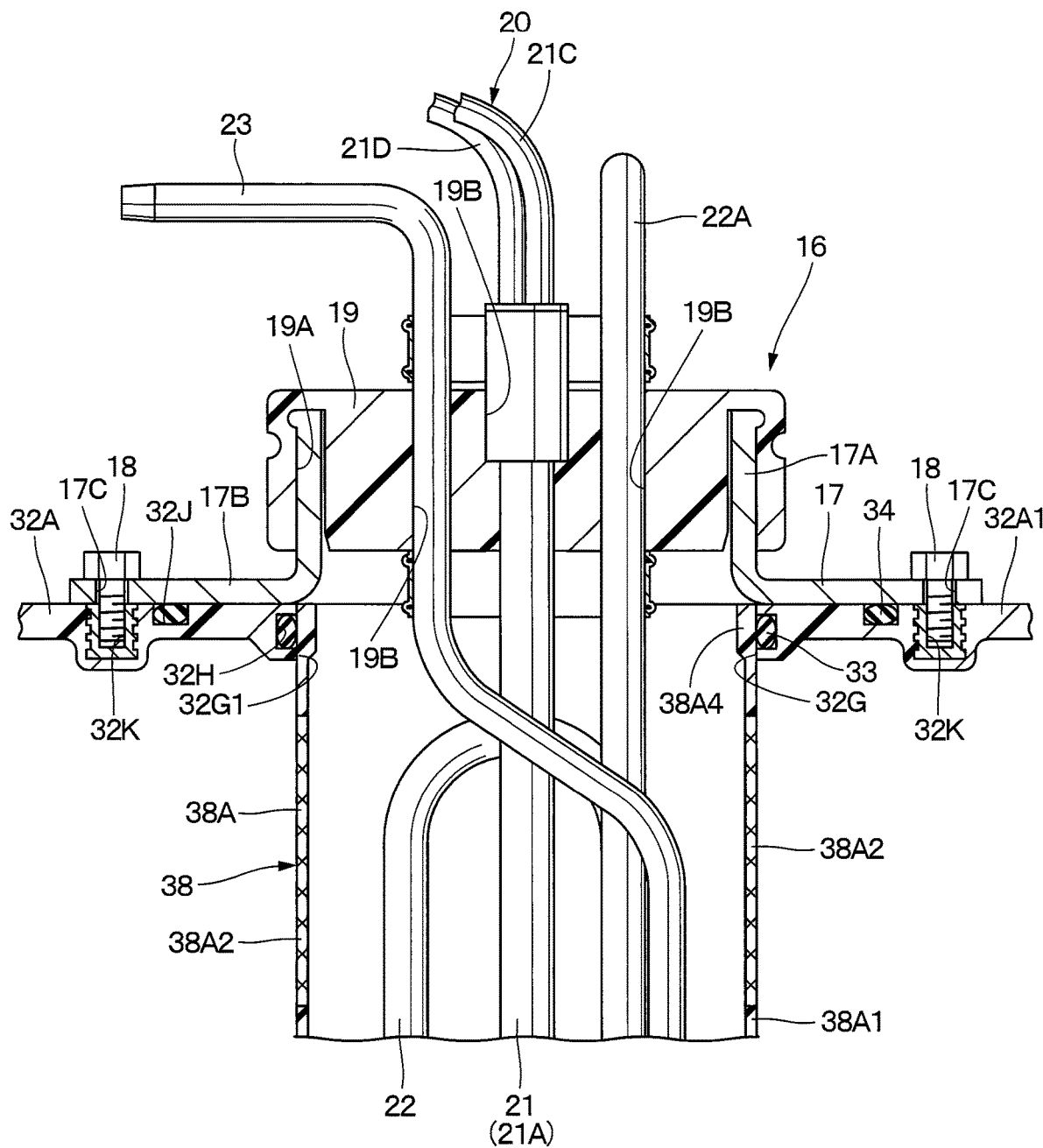
FIG. 10 is a cross section of essential part enlargement showing an upper part side (insertion side) of a filter in FIG. 9 in an enlarging manner.

As shown in FIG. 10, the flat surface 32A1 of the top surface part 32A is provided with a unit insertion opening 32G. The unit insertion opening 32G is an opening for insertion of the sensor unit 20 and acts also as a fitting part in which an upper end 38A4 of a filter tubular part 38A in the filter 38 to be described later is fitted. Accordingly, an inner peripheral surface 32G1 of the unit insertion opening 32G is provided with an annular groove 32H over the entire circumference. An O-ring 33 as a resilient member is inserted in the annular groove 32H. In addition, an annular groove 32J is disposed on the flat surface 32A1 to surround the unit insertion opening 32G. An O-ring 34 is inserted in the annular groove 32J. Further, the flat surface 32A1 of the top surface part 32A is provided with a plurality of screw holes 32K (only the two are shown) in which the bolts 18 are screwed, formed on an outer peripheral side of the annular groove 32J.

Figure 11:
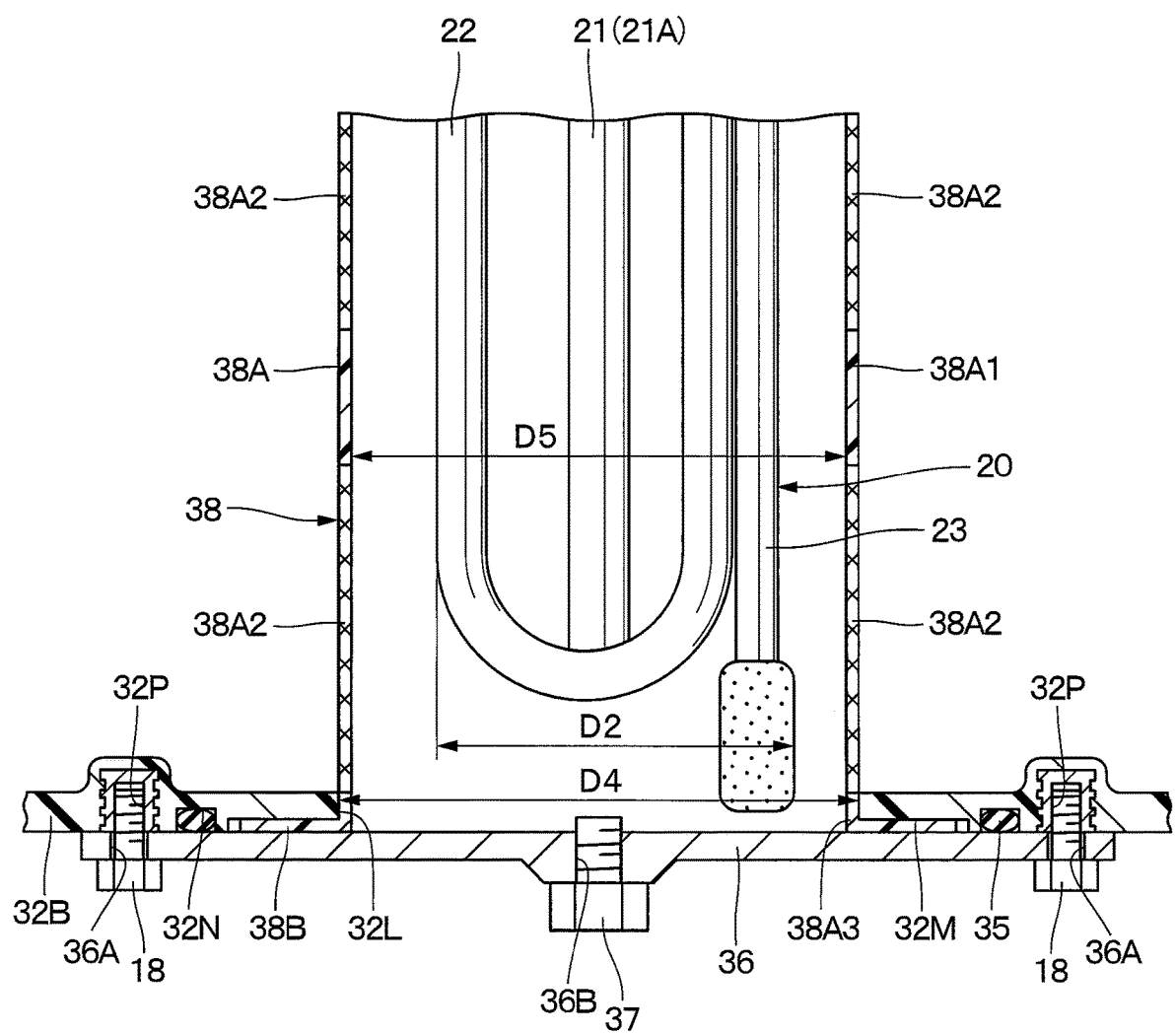
FIG. 11 is a cross section of essential part enlargement showing a bottom part side (closing bottom plate side) of the filter in FIG. 9 in an enlarging manner.

On the other hand, as shown in FIG. 11, the bottom surface part 32B of the tank body 32 is provided with a filter insertion opening 32L as an opening in a position facing the sensor unit 20 in the upper-lower direction, that is, in a position right under the unit insertion opening 32G. The filter insertion opening 32L is for insertion of the filter tubular part 38A of the filter 38 and opens with a diameter dimension (inner diameter dimension) D4 larger than the external dimension D2 of the sensor unit 20. Thereby, an inner diameter dimension D5 of the filter tubular part 38A of the filter 38 to be inserted in the filter insertion opening 32L can be made larger than the external dimension D2 of the sensor unit 20.

An annular recessed part 32M is formed on a bottom surface side of the bottom surface part 32B of the tank body 32 to extend in a radial outside from the filter insertion opening 32L. A flange part 38B of the filter 38 is arranged in the recessed part 32M. An annular groove 32N is disposed in the bottom surface part 32B of the tank body 32 to surround the recessed part 32M. An O-ring 35 is inserted in the annular groove 32N. Further, a plurality of screw holes 32P (only the two are shown) in which Bolts 18 are screwed are disposed in the bottom surface part 32B to be positioned on an outer peripheral side of the annular groove 32N.

Next, descriptions will be made of the configuration of the closing bottom plate 36 and the mounting structure to the tank body 32 that are part of the characterized portion in the present invention.

Figure 12:
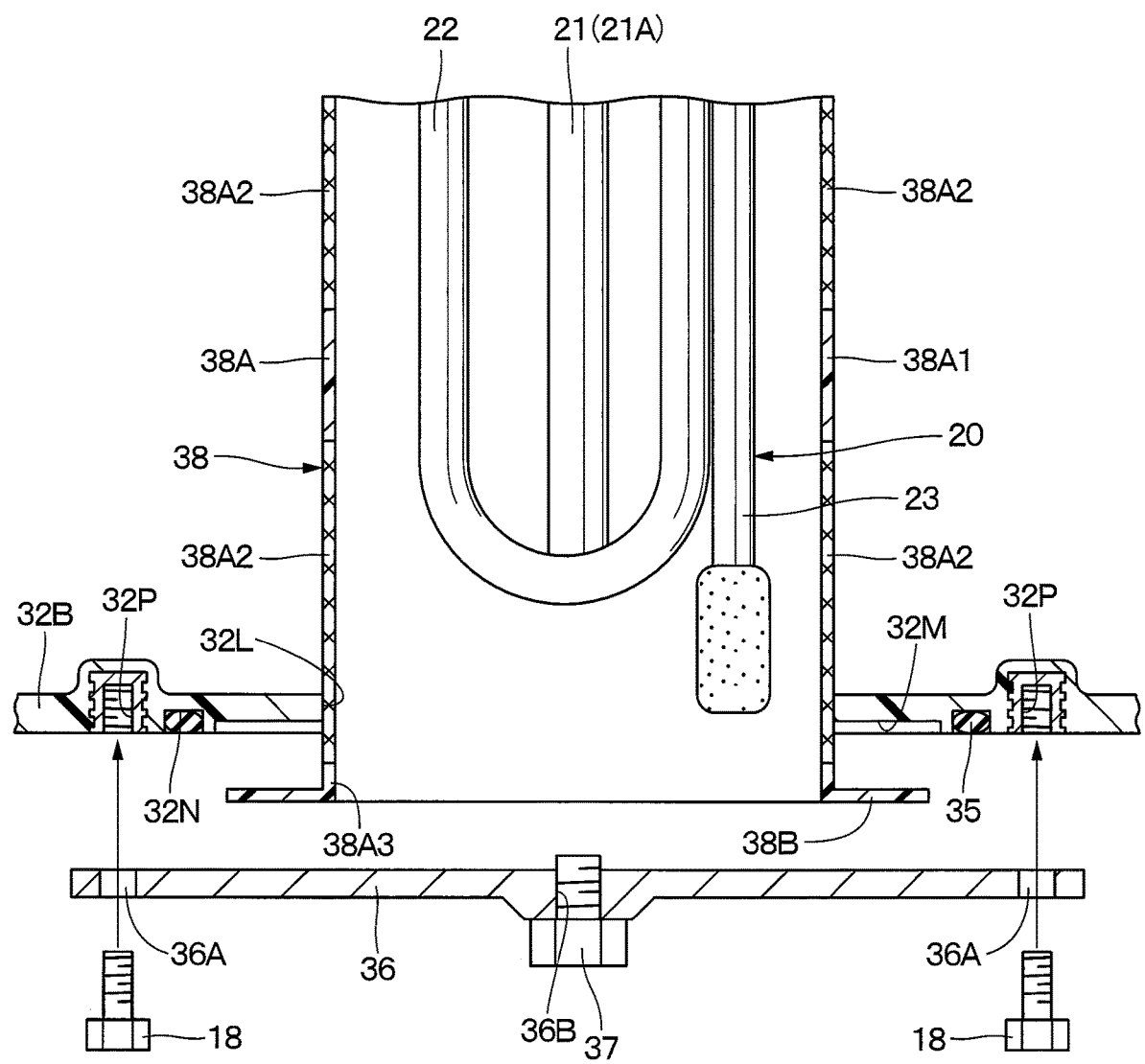
FIG. 12 is an exploded cross section showing a bottom surface part of a tank body, a closing bottom plate and the filter as shown in FIG. 11 in an exploding manner.

The closing bottom plate 36 forms a closing member and is formed as a circular metallic plate, for example. As shown in FIG. 12, a plurality of bolt through holes 36A are formed on an outer peripheral side of the closing bottom plate 36 to correspond to the respective screw holes 32P of the bottom surface part 32B. In addition, a screw hole 36B is formed in the closing bottom plate 36 to penetrate in the upper-lower direction in a position of the inside of the filter 38, that is, in a position of a substantially central part. The screw hole 36B discharges the urea water in the inside of the tank body 32 at the maintenance work of the tank body 32. A drain plug 37 regularly composed of a bolt is inserted in the screw hole 36B.

Here, the closing bottom plate 36 is caused to abut on a bottom surface of the bottom surface part 32B to cover the filter insertion opening 32L. In this state, the bolt 18 inserted in each of the bolt through holes 36A is screwed in each of the screw holes 32P of the bottom surface part 32B. Thereby, the closing bottom plate 36 can be mounted to the bottom surface part 32B. At this time, the closing bottom plate 36 enables the flange part 38B of the filter 38 to be tightly held between the closing bottom plate 36 and the bottom surface part 32B.

Next, descriptions will be made of the configuration of the filter 38 and the mounting procedure to the tank body 32 that are part of the characterized portion in the present invention. Here, the second embodiment is configured such that the filter 38 is inserted in the tank body 32 from the lower side. Thereby, in the filter 38 the lower end thereof is a base end and the upper end thereof is a tip end.

The filter 38 is disposed in the tank body 32 to surround the level sensor 21, the heater 22, the supply line 23 and the return line. The filter 38 is structured to reverse the filter 24 according to the first embodiment in the upper-lower direction. That is, the filter 38 is formed of the filter tubular part 38A composed of a framing tube 38A1 and a filter sheet 38A2, and the flange part 38B extending in a radial outside from a lower end 38A3 of the filter tubular part 38A.

Accordingly, the filter tubular part 38A is formed as a tubular body slightly smaller than the filter insertion opening 32L. An inner diameter dimension D5 thereof is formed in a dimension larger than the external dimension D2 of the sensor unit 20. That is, a relation of the diameter dimension D4 of the filter insertion opening 32L, the external dimension D2 of the sensor unit 20 and the inner diameter dimension D5 of the filter tubular part 38A is set to be indicated at the following Formula 2.

$$D2<D5<D4 \qquad \text{[Formula 2]}$$

Thereby, the sensor unit 20 and the filter 38 can be pulled out of or inserted in the tank body 32 not to come in contact with each other.

An explanation will be made of an example of the procedure in a case of mounting the filter 38 on the tank body 32. The filter tubular part 38A in the filter 38 is inserted upward in the filter insertion opening 32L of the tank body 32 from the upper end 38A4. At this time, the lower end 38A3 of the filter tubular part 38A is supported by the filter insertion opening 32L. Thereby, the lower side of the filter tubular part 38A can be radially positioned by the filter insertion opening 32L. On the other hand, the upper end 38A4 of the filter tubular part 38A is fitted in the unit insertion opening 32G. Thereby, the upper side of the filter tubular part 38A can be radially positioned by the unit insertion opening 32G. In addition, in a state where the upper end 38A4 of the filter tubular part 38A is fitted in the unit insertion opening 32G, since the upper end 38A4-side can be held by the O-ring 33 having resiliency, the upper end 38A4-side of the filter tubular part 38A can be protected from vibrations or impacts.

The urea water tank 31 according to the second embodiment has the configuration as described above, and next, an explanation will be made of an example of the working procedure of part of the features among the working procedure in a case of assembling the urea water tank 31.

The filter tubular part 38A of the filter 38 is inserted in the filter insertion opening 32L of the tank body 32 from the upper end 38A4-side. Thereby, the upper end 38A4 of the filter tubular part 38A is fitted in the unit insertion opening 32G through the O-ring 33. In addition, the flange part 38B is arranged in the recessed part 32M of the tank body 32. Thereby, the filter 38 can be inserted in the tank body 32 in a positioning state.

When the filter 38 is inserted in the tank body 32, the closing bottom plate 36 is caused to abut on the bottom surface part 32B of the tank body 32. In this state, the bolt 18 is inserted in each of the bolt through holes 36A disposed in the closing bottom plate 36 and the bolt 18 is screwed in each of the screw holes 32P of the bottom surface part 32B.

Thereby, the closing bottom plate 36 can be mounted to the tank body 32 using each of the bolts 18. Using the mounting structure of the closing bottom plate 36, the filter 38 can be mounted such that the flange part 38B is tightly held between the bottom surface part 32B of the tank body 32 and the closing bottom plate 36.

In this way, also in the second embodiment as thus configured, operational effects substantially similar to those in the aforementioned first embodiment can be obtained. Particularly, according to the second embodiment, the filter 38 can be inserted upward from the bottom surface part 32B-side of the tank body 32. In addition, the closing bottom plate 36 enables the filter 38 inserted in the tank body 32 to be held between the closing bottom plate 36 and the bottom surface part 32B.

Figure 13:
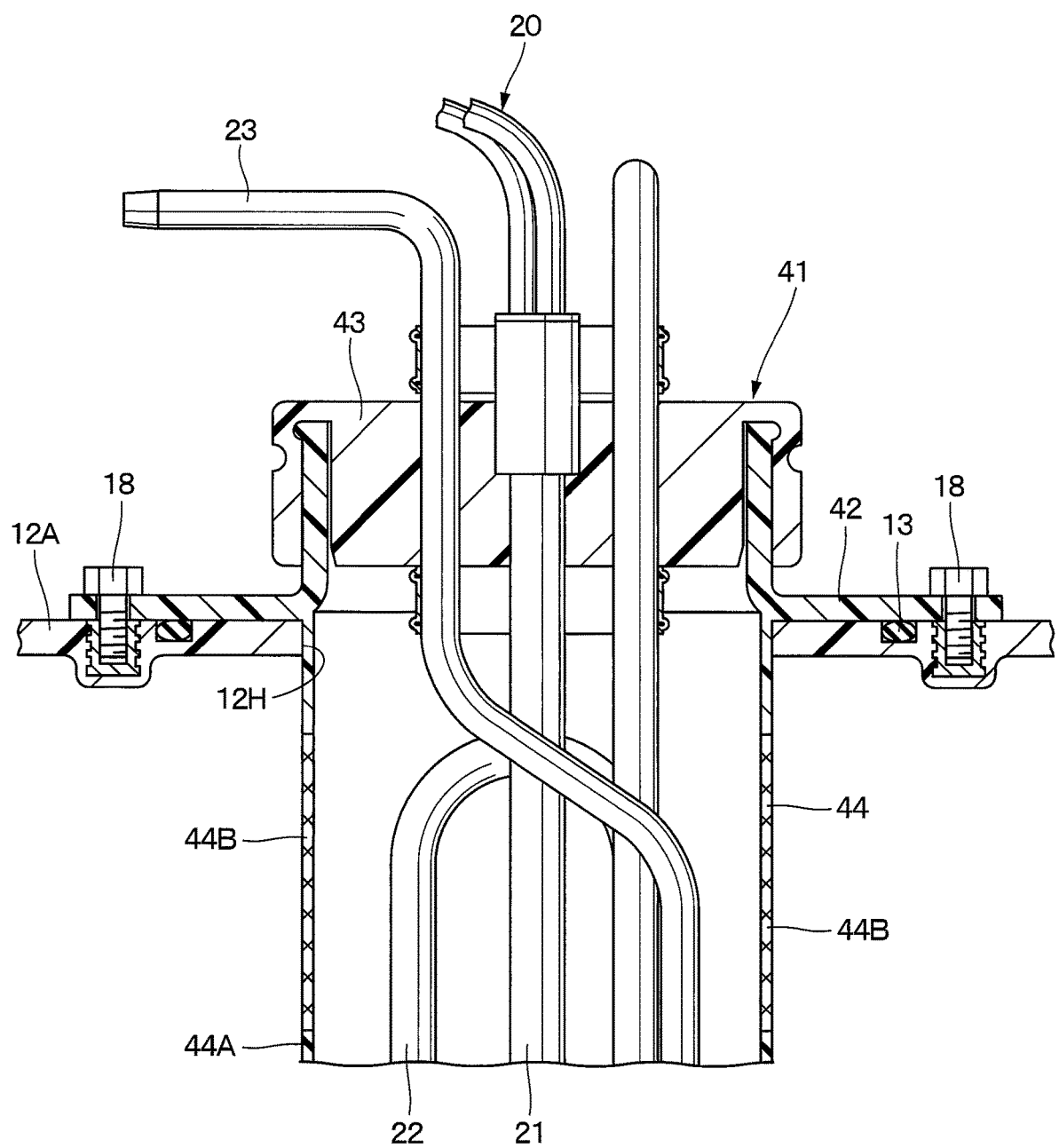
FIG. 13 is a cross section of essential part enlargement showing a filter integral type mounting member according to a third embodiment in the present invention together with a top surface part of a tank body and a sensor unit.

Next, FIG. 13 shows a third embodiment in the present invention. The present embodiment is characterized in that a filter has a base end that is disposed integrally with a closing member for closing a unit insertion opening and the filter is inserted in the tank body through the unit insertion opening from the tip end side. It should be noted that in the third embodiment, components identical to those in the aforementioned first embodiment are referred to as identical reference numerals to omit an explanation thereof.

In FIG. 13, a filter integral type mounting member 41 according to the third embodiment includes a mounting tubular body 42 and a cap body 43 forming a closing member, and a filter 44 formed integrally with the mounting tubular body 42. The mounting tubular body 42 and the cap body 43 has the configuration as similar to the mounting tubular body 17 and the cap body 19 according to the aforementioned first embodiment other than a point where the mounting tubular body 42 is made of a resin material. Therefore, an explanation of the configuration can be omitted.

The filter 44 is formed of a framing tube 44A and a filter sheet 44B as similar to the filter tubular part 24A of the filter 24 according to the first embodiment. An upper end of the framing tube 44A is mounted integrally with the mounting tubular body 17.

In this way, also in the third embodiment as thus configured, operational effects as substantially similar to those in the aforementioned first embodiment can be obtained. Particularly, according to the third embodiment, the filter 44 can be mounted integrally with the mounting tubular body 17. This arrangement can reduce the number of components to improve workability at the replacement work of the filter 44 at the assembling work.

Figure 14:
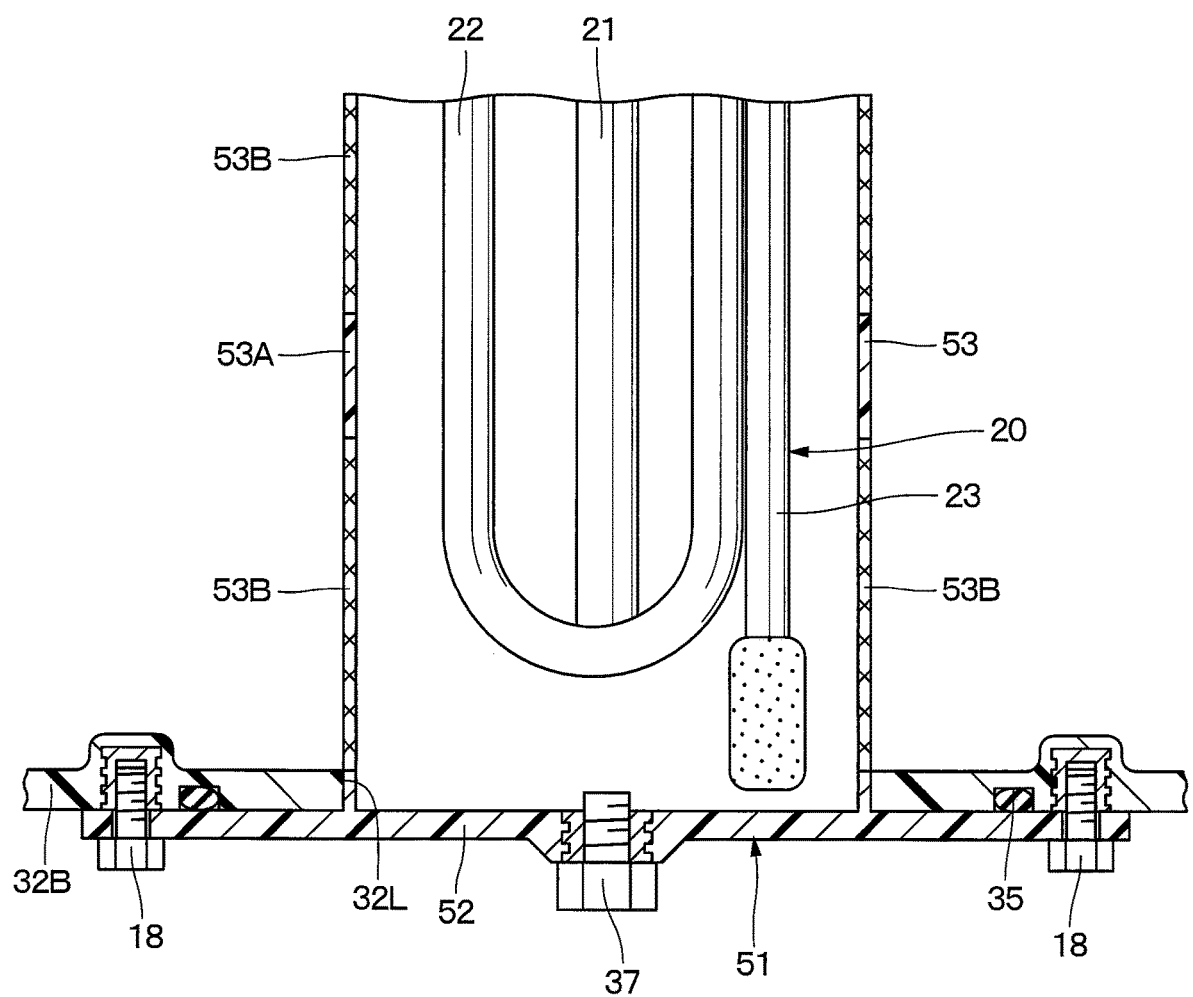
FIG. 14 is a cross section of essential part enlargement showing a filter integral type closing bottom plate according to a fourth embodiment in the present invention together with a bottom surface part of a tank body and a sensor unit.

Next, FIG. 14 shows a fourth embodiment in the present invention. The present embodiment is characterized in that a filter has abase end that is disposed integrally with a closing member for closing a unit insertion opening and the filter is inserted in the tank body through the unit insertion opening from the tip end side. It should be noted that in the fourth embodiment, components identical to those in the aforementioned second embodiment are referred to as identical reference numerals to omit an explanation thereof.

In FIG. 14, a filter integral type mounting member 51 according to the fourth embodiment includes a bottom plate body 52 and a filter 53 formed integrally with the bottom plate body 52. The bottom plate body 52 has the configuration as similar to the closing bottom plate 36 according to the aforementioned second embodiment other than a point where the bottom plate body 52 is made of a resin material. Therefore, an explanation of the configuration can be omitted.

The filter 53 is formed of a framing tube 53A and a filter sheet 53B as similar to the filter tubular part 38A of the filter 38 according to the second embodiment. A lower end of the framing tube 53A is mounted integrally with the bottom plate body 52.

In this way, also in the fourth embodiment as thus configured, operational effects as substantially similar to those in the aforementioned second embodiment can be obtained. Particularly, according to the fourth embodiment, the filter 53 is mounted integrally with the bottom plate body 52. Thereby, the number of components can be reduced to improve workability at the replacement work of the filter 53 at the assembling work.

It should be noted that the first embodiment exemplifies a case where the mounting tubular body 17 of the sensor mounting member 16 and the cap body 19 are formed of different materials. However, the present invention is not limited thereto, but, for example, may be configured such that the mounting tubular body 17 and the cap body 19 are integrally formed. This configuration may be likewise applied to other embodiments as well.

In the first embodiment, the annular groove 12N is provided at the inner peripheral surface 12M1 of the fitting part 12M in the tank body 12 and the O-ring 14 as a resilient member is inserted in the annular groove 12N. Thereby, there is exemplified a case of resiliently holding the lower end 24A4 of the filter tubular part 24A in the filter 24 by the O-ring 14 in the tank body 12-side. However, the present invention is not limited thereto, but may be configured such that an annular groove is disposed on an outer periphery of the lower end 24A4 of the filter tubular part 24A in the filter 24 and an O-ring is inserted in the annular groove. This configuration may be likewise applied to other embodiments as well.

The first embodiment exemplifies a case where the unit insertion opening 12H as the opening is disposed on the top surface part 12A of the tank body 12 only and both of the sensor unit 20 and the filter 24 are inserted downward from the unit insertion opening 12H. In addition, in the second embodiment, the unit insertion opening 32G as the opening is disposed on the top surface part 32A of the tank body 32. In this arrangement, the sensor unit 20 is inserted downward from the unit insertion opening 32G. On the other hand, the filter insertion opening 32L as the opening is disposed on the bottom surface part 32B of the tank body 32. In this arrangement, there is exemplified a case where the filter 38 is inserted upward from the filter insertion opening 32L.

However, the present invention is not limited to these configurations. That is, the present invention may be configured such that the unit insertion opening as the opening is disposed on the bottom surface part of the tank body only, and both of the sensor unit and the filter are inserted upward from the unit insertion opening. Further, this arrangement may be likewise applied to the third embodiment as well. In this case, the filter integral type mounting member 41 and the sensor unit 20 may be inserted upward from the unit insertion opening as the opening disposed on the bottom surface part of the tank body only.

Each of the embodiments is explained by taking the urea water tank 11 or 13 of the hydraulic excavator 1 of the crawler type as an example. However, the present invention is not limited thereto, and may be applied widely to urea water tanks disposed in other construction machines such as a wheel type hydraulic excavator, a hydraulic crane, a wheel loader and the like.

DESCRIPTION OF REFERENCE NUMERALS

1: Hydraulic excavator (Construction machine)
2: Lower traveling structure (Vehicle body)
3: Upper revolving structure (Vehicle body)
6: Engine
10: NOx purifying device (Exhaust gas post-treatment device)
11, 31: Urea water tank
12, 32: Tank body
12A, 32A: Top surface part
12B, 32B: Bottom surface part
12H: Unit insertion opening (Opening)
12M: Fitting part
12P, 36B: Screw hole
14, 33: O-ring (Resilient member)
15, 37: Drain plug
16: Sensor mounting member (Closing member)
20: Sensor unit
21: Level sensor
24, 38, 44, 53: Filter
24A, 38A: Filter tubular part
24A3: Upper end (Base end)
24A4: Lower end (Tip end)
24B, 38B: Flange part
32G: Unit insertion opening (Opening acting as fitting part as well)
32L: Filter insertion opening (Opening)
36: Closing bottom plate (Closing member)
38A3: Lower end (Base end)
38A4: Upper end (Tip end)
41: Filter integral type mounting member
42: Mounting tubular body (Closing member)
43: Cap body (Closing member)
51: Filter integral type closing bottom plate
52: Bottom plate body (Closing member)
D1: Diameter dimension of unit insertion opening
D2: External dimension of sensor unit
D3, D5: Inner diameter dimension of filter tubular part in filter
D4: Diameter dimension of filter insertion opening

The invention claimed is:

1. A urea water tank for a construction machine comprising:
a tank body for reserving urea water that is supplied to an exhaust gas post-treatment device for purifying an exhaust gas of an engine mounted on a vehicle body; and
a sensor unit that is disposed to be inserted in said tank body and includes a sensor to detect a state of the urea water,
wherein
the urea water tank for the construction machine includes:
an opening that is disposed on a top surface part of said tank body and opens more largely than an external dimension of said sensor unit;
a closing member that closes said opening; and
a filter which is formed as a tubular body to surround said sensor unit, and inserted in said opening from a tip end side of said filter, and having a base end mounted on said top surface part of said tank body by using said closing member,
said closing member is formed of a mounting tubular body that includes a tubular part with a diameter dimension equivalent to said opening and a diameter expanded part extending in a radial direction outward from a lower end of said tubular part, and a cap body with an annular groove in which said tubular part is fitted,
said opening is a unit insertion opening for inserting said sensor unit,
said sensor unit is mounted to said cap body,
said filter includes a flange part on said base end,
said filter is inserted in said tank body through said unit insertion opening from a tip end opposite the flange part on said base end,
said flange part of said filter is mounted to be tightly held between said diameter expanded part of said closing member and said top surface part of said tank body, and
a bottom surface part of said tank body is provided with a fitting part in which the tip end side of said filter is fitted.

2. The urea water tank for the construction machine according to claim 1, wherein
a resilient member is disposed between the tip end of said filter and said fitting part to resiliently hold said tip end of said filter.

3. A urea water tank for a construction machine, comprising:
a tank body for reserving urea water that is supplied to an exhaust gas post-treatment device for purifying an exhaust gas of an engine mounted on a vehicle body; and
a sensor unit that is disposed to be inserted in said tank body and includes a sensor to detect a state of the urea water,
the urea water tank for the construction machine including:
an opening that is disposed on a bottom surface part of said tank body and opens more largely than an external dimension of said sensor unit;
a closing member that closes said opening; and
a filter which is formed as a tubular body to surround said sensor unit, and inserted in said opening from a tip end side of said filter, and having a base end mounted on said bottom surface part of said tank body by using said closing member,
wherein
said opening is a filter insertion opening for inserting said filter in a position of facing said sensor unit in an upper-lower direction,
said filter includes a flange part on said base end,
said flange part of said filter is mounted to be tightly held between said closing member and said bottom surface part of said tank body,
said sensor unit is mounted to said tank body by a sensor mounting member,
said sensor mounting member is formed of a mounting tubular body that is fixed to said tank body and includes a tubular part and a diameter expanded part extending in a radial direction outward from a lower end of said tubular part, and a cap body with an annular groove in which said tubular part is fitted and on which said sensor unit is attached,
a top surface part of said tank body is provided with a fitting part in which a tip end of said filter is fitted.

4. The urea water tank for the construction machine according to claim 3, wherein a resilient member is disposed between the tip end of said filter and said fitting part to resiliently hold said tip end of said filter.

\* \* \* \* \*